(12) United States Patent
Storch et al.

(10) Patent No.: US 8,341,025 B2
(45) Date of Patent: *Dec. 25, 2012

(54) E-MAIL BASED GIFT DELIVERY

(75) Inventors: Gerald L. Storch, Wayne, NJ (US);
Gregg A. Kromrey, Hudson, WI (US)

(73) Assignee: Target Brands, Inc., Minneapolis, MN (US)

( * ) Notice: Subject to any disclaimer, the term of this patent is extended or adjusted under 35 U.S.C. 154(b) by 552 days.

This patent is subject to a terminal disclaimer.

(21) Appl. No.: 12/562,323

(22) Filed: Sep. 18, 2009

(65) Prior Publication Data

US 2010/0010920 A1    Jan. 14, 2010

Related U.S. Application Data

(62) Division of application No. 11/288,944, filed on Nov. 29, 2005, now Pat. No. 7,606,738.

(51) Int. Cl.
*G06Q 30/00* (2012.01)
(52) U.S. Cl. .......... 705/26.1; 705/1.1; 705/27.1; 705/76
(58) Field of Classification Search .................... 705/1.1, 705/26.1, 27.1, 76
See application file for complete search history.

(56) References Cited

U.S. PATENT DOCUMENTS

| | | | |
|---|---|---|---|
| 4,759,063 A | 7/1988 | Chaum | |
| 5,812,670 A | 9/1998 | Micali | |
| 5,878,140 A | 3/1999 | Chaum | |
| 6,108,644 A | 8/2000 | Goldschlag et al. | |
| 6,748,367 B1 | 6/2004 | Lee | |
| 6,917,922 B1 | 7/2005 | Bezos et al. | |
| 7,127,404 B1 | 10/2006 | Poon | |
| 2002/0013739 A1 | 1/2002 | O'Donnell et al. | |
| 2002/0019764 A1* | 2/2002 | Mascarenhas | 705/10 |
| 2002/0023024 A1 | 2/2002 | Kaimowitz | |
| 2002/0046163 A1 | 4/2002 | Shahidi | |
| 2002/0095298 A1 | 7/2002 | Ewing | |
| 2002/0138354 A1 | 9/2002 | Seal et al. | |
| 2002/0165734 A1* | 11/2002 | Halamka | 705/2 |
| 2002/0178089 A1 | 11/2002 | Bezos et al. | |
| 2004/0083184 A1 | 4/2004 | Tsuei et al. | |
| 2004/0225573 A1 | 11/2004 | Ling | |
| 2005/0154652 A1 | 7/2005 | Bezos et al. | |

(Continued)

OTHER PUBLICATIONS

Lostpeople.com, "trace email address search," http://www.lostpeople.com/trace-email-address.shtml.3 pgs.*

*Primary Examiner* — Yogesh C Garg
(74) *Attorney, Agent, or Firm* — Griffiths & Seaton PLLC

(57) ABSTRACT

A retail system enabling a first party to purchase a gift and to deliver the gift to a second party comprises a retailer computer and a communication network enabling a user device to communicate with the retailer computer. The retailer computer is programmed to provide a gift website accessible by the first party via the user device and includes a merchandise module and a delivery module. The merchandise module enables the first party to purchase a gift. The delivery module is adapted to receive an e-mail address or pseudonym of the second party from the first party, to procure shipping addresses associated with the e-mail address or pseudonym, to enable the first party to select one of the shipping addresses, and to cause the gift to be shipped to the selected shipping address without revealing the selected shipping address to the first party. Other systems and methods are also disclosed.

20 Claims, 6 Drawing Sheets

U.S. PATENT DOCUMENTS

| | | | |
|---|---|---|---|
| 2005/0246191 A1* | 11/2005 | Lux | 705/1 |
| 2006/0069627 A1 | 3/2006 | Petersen et al. | |
| 2006/0155999 A1* | 7/2006 | Holtzman et al. | 713/172 |
| 2006/0195364 A1 | 8/2006 | Shroff et al. | |
| 2008/0154632 A1* | 6/2008 | Jacobi et al. | 705/1 |
| 2008/0306877 A1* | 12/2008 | Mandeles et al. | 705/76 |

* cited by examiner

E-MAIL BASED GIFT DELIVERY

CROSS-REFERENCE TO RELATED APPLICATION

This application is a divisional of and claims priority under 35 U.S.C. §120 to U.S. patent application Ser. No. 11/288,944, filed Nov. 29, 2005 and entitled "E-MAIL BASED GIFT DELIVERY," which is incorporated herein in its entirety.

BACKGROUND OF THE INVENTION

It is now commonplace for consumers to purchase goods via the Internet from retail websites or from other websites offering products for sale. Generally at such websites, consumers can peruse on-line catalogs of products that are available for sale, purchase selected products, and have the selected products delivered to them. Additionally, a growing trend among consumers is to purchase personal gifts via such websites and have the gifts shipped directly to a gift recipient. This is particularly true where the gift recipient resides at a location remote from the user purchasing the gift. In such instances, a consumer, or website user, is typically required to provide to the on-line retailer the shipping address of the gift recipient.

However, people frequently are in contact with one another via e-mail or other electronic means (e.g. instant messaging, personal websites, etc.) and often do not know the address at which another person resides or an associated shipping address. Thus, although the name and even a general location (e.g. city/state) of the recipient may be known, no specific shipping address or delivery location may be available. Therefore, without additional research or inquiry by the gift-giver, gift delivery may not be possible. Additionally, if at a loss for time or if the gift-giver wishes to surprise the gift recipient, such additional research (e.g. asking the gift recipient for his/her address) may not be possible.

In some instances, people may maintain anonymous relationships with one another. For example, on-line dating services often enable members to send messages or chat with one another using assumed names or pseudonyms so as to remain anonymous to one another. In such a setting, a first member may wish to send a gift to a second member whom he/she knows only by a pseudonym and who wishes to remain anonymous to the first member.

Embodiments of the invention enable a gift-giver to send a gift to a gift recipient even when the gift recipient's specific shipping or delivery address is unknown to the gift-giver.

SUMMARY

One aspect of the present invention relates to a retail system enabling a first party to purchase a gift and to deliver the gift to a second party. The system includes a retail computer and a communication network. The retail computer is programmed to provide a gift website accessible by the first party via a user device and includes a merchandise module and a delivery module. The merchandise module enables the first party to select and purchase a gift. The delivery module is adapted to receive an e-mail address or pseudonym of the second party from the first party. The delivery module is configured to procure up to several shipping addresses associated with the e-mail address or pseudonym with each shipping address comprising a plurality of address components, to query the first party regarding one or more address components of the up to several shipping addresses, to enable the first party to select one of the up to several shipping addresses based on the queries, and to cause the gift to be shipped to the selected shipping address without revealing the selected shipping address to the first party. The communication network enables the user device to communicate with the retailer computer.

BRIEF DESCRIPTION OF THE DRAWINGS

Embodiments of the invention will be described with respect to the figures, in which like reference numerals denote like elements, and in which.

DETAILED DESCRIPTION

Figure 1:
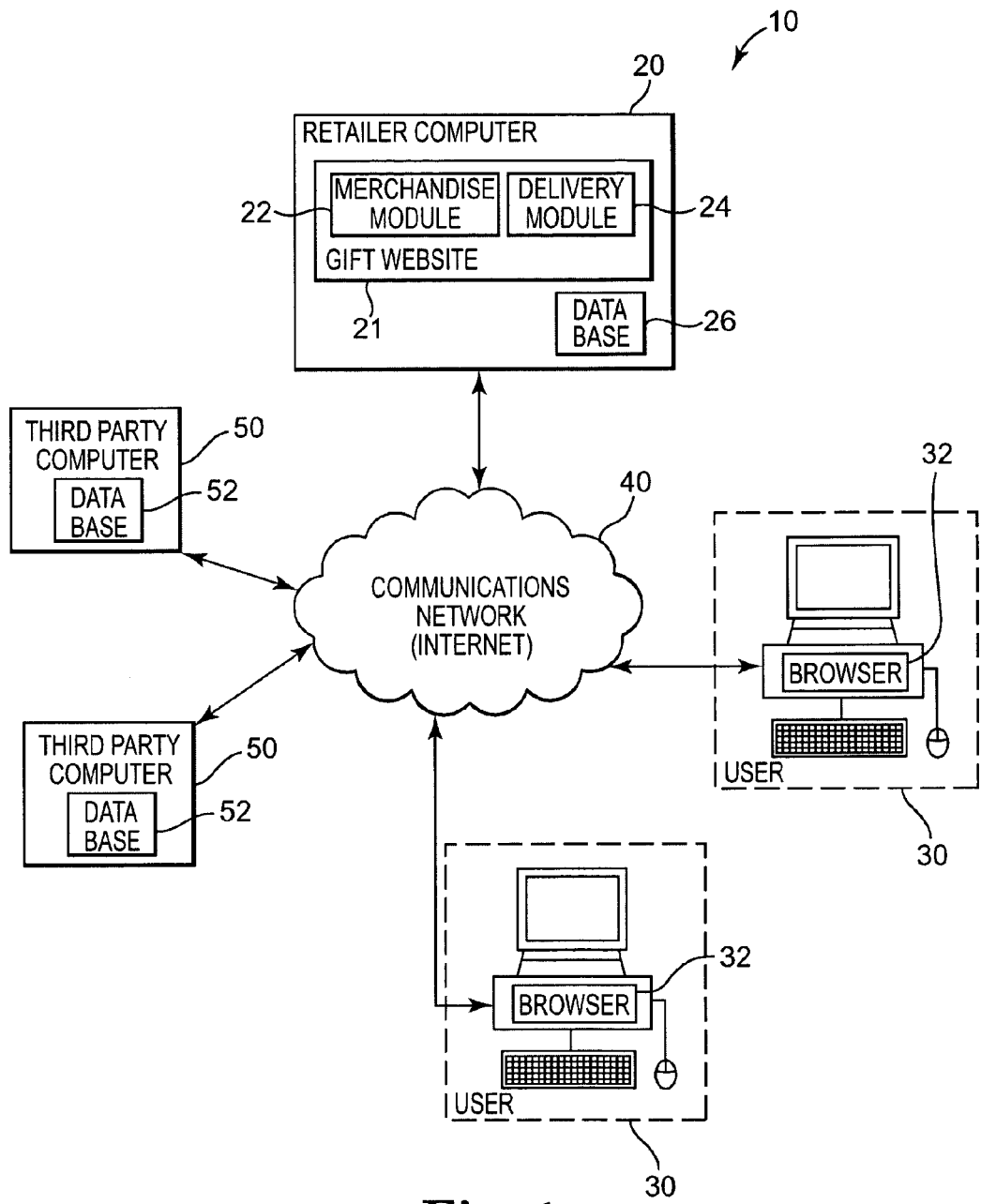
FIG. 1 is block diagram illustrating one embodiment of a retail system according to the present invention.

FIG. 1 is a block diagram generally illustrating one embodiment of a retail system 10 according to the present invention, which enables a first party to purchase and deliver a gift to a second party when the first party knows only an e-mail address of the second party. Retail system 10 includes a retailer computer 20 which is programmed to provide a retailer website which is accessible by one or more user devices 30 via a communications network 40. Retailer computer 20 includes gift website 21 having a merchandise module 22 and a delivery module 24. Merchandise module 22 provides an on-line catalog that enables a user visiting the retailer website to peruse, select, and purchase merchandise offered for sale by the retailer.

Communications network 40, as employed herein, is Internet-based according to one embodiment and may include local area networks, wide area networks and private networks (e.g. Intranets), but can comprise any suitable network or communications link that supports communications between different parties located at respective computers or other suitable electronic devices, as understood by those of skill in the art. User device 30 includes an Internet or World Wide Web browser 32 or other functionally equivalent software that enables a user to view the contents of the retailer website provided by retailer computer 20, including the on-line catalog provided by merchandise module 22, via communications network 40. Although illustrated as a personal computer, user device 30 can comprise any type of Internet compliant communications device such as, for example, a personal digital assistant and/or an Internet compliant telephone.

In operation, a first party accesses the retailer website via a user device, such as user device 30, and browses through products displayed in the on-line catalog provided by merchandise module 22. Upon selecting a product or products that the first party would like to purchase as a gift for a second party, the merchandise module transfers the first party to delivery module 24.

Delivery module 24 prompts the first party to provide an e-mail address of the second party to which the gift is desired to be delivered. In response, delivery module 24 procures up to several street addresses associated with the e-mail address. In one embodiment, delivery module 24 procures the street address(es) by searching an internal database 26 maintained by retailer computer 20 and comprising street addresses and other information associated with e-mail addresses that have been provided by past users who have visited the retailer website, with each street address comprising a plurality of components (e.g., street, zip code, state, etc.). In one embodiment, in addition to internal database 26, delivery module 24 is configured to procure street addresses from one or more third party computers 50 maintaining similar e-mail and street address databases 52. In one embodiment, third party computers 50 may comprise portions of an on-line membership network, such as a popular Internet service provider, for example, with which the retailer has contracted for access.

In one embodiment, when one or more such street addresses are found, delivery module 24, without revealing the procured street addresses associated with the e-mail address, queries the first user about selected components of the address(es) to enable the first user to assess the likelihood that one of the procured street addresses is the correct street address of the second party. For example, although the first party may correspond with the second party solely via e-mail or other means (e.g. telephone) and may not know the second party's precise street address, often the first party may know the state, city, and even the street (but not the house/apartment number) of the second party's street address. This is particularly true when the first and second parties are long-time friends, not just anonymous acquaintances who know one another only by an on-line pseudonym or e-mail address.

Thus, in one embodiment, for example, delivery module 24 may query the first party as to the state, city, and even the street at which the first party believes the second party to reside. In response, delivery module 24 indicates which, if any, of the procured street addresses have components matching the components provided by the first party in response to the queries. Based on which, if any, of the procured street addresses have components matching his/her responses, the first party can choose to select, or not select, one of the procured street addresses to which the gift is to be shipped. In one embodiment, delivery module 24 informs the first party of the number of possible street addresses, if any, that were found to be associated with the e-mail address.

As an illustrative example, in one instance, delivery module 24 may find three street addresses associated with the e-mail address of the second party. Although the first party does not know the street address of the second party, he/she is a long-time acquaintance of the second party and knows that the second party lives in Minneapolis, Minn. In response to the first user entering Minneapolis and Minnesota as answers to queries regarding the state and city components of the second party's shipping address, delivery module 24 indicates that one of the three procured street addresses matches these components. Although the first party does not know the street address of the second party, the first party may be fairly certain that the procured street address corresponding to Minneapolis, Minn., is likely the correct street address for the second party and select that address as the address to which to ship the gift. However, if delivery module 24 indicates that more than one of the procured street addresses are in Minneapolis, Minn., the first user may choose not to select either of the addresses.

If the first user selects one of the procured street addresses, delivery module 24 provides an output that enables the selected gift to be shipped to the selected address without revealing the selected address to the first user. In one embodiment, for example, delivery module 24 may provide shipping instructions, including the selected address, to an internal shipping department associated with the retailer.

However, in some instances, delivery module 24 may not find any street addresses associated with the e-mail address provided by the first party or, as described above, may procure one or more addresses from which the first party is unable to select a street address due to being unable to adequately assess the street addresses through the querying process. For example, while delivery module 24 may find only one street address associated with the e-mail address, none of the address components may match those provided by the first user during the querying process. In such instances, the first user may not be able to or may not wish to select a procured street address, and thus be unable to ship the gift to the second party. In such an instance, delivery module 24 may prompt the first party as to whether he/she would like continue with the transaction and have the gift delivered to his/her own address or to cancel the transaction.

A retail system according to embodiments of the present invention, such as retail system 10 described above, enables a user to select, purchase, and deliver a gift to a recipient based on the recipient's e-mail address without revealing the street/shipping address of the recipient to the user. By not disclosing the street/shipping address of the recipient to the user, retail system 10 enables a user to send a gift to the recipient while maintaining the recipient's privacy.

Figure 2:
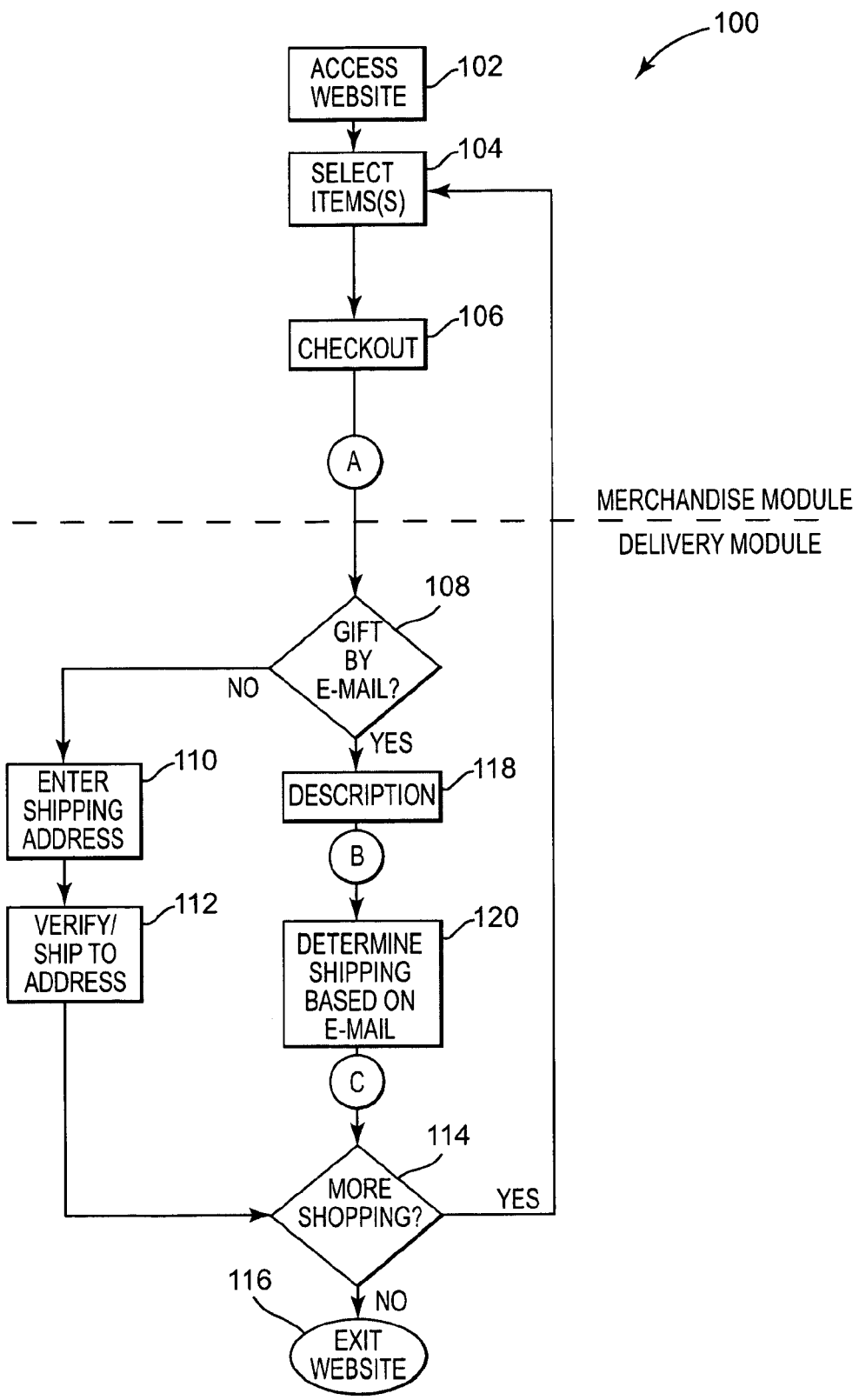
FIG. 2 is a flow diagram illustrating one embodiment of a process for selecting and delivering a gift according to the present invention.

FIG. 2 is a flow diagram illustrating generally one embodiment of a process 100 for selecting and delivering a gift to a recipient based on the recipient's e-mail in accordance with the present invention. Process 100 begins at 102 where a first party accesses the retailer website on retailer computer 20 via a user device, such as user device 30. At 104, the first party browses the on-line catalog and selects one or more items. The first party then proceeds to checkout at 106 at which time payment and other information may be collected.

After checking out at 106, the first party is queried at 108 as to whether he/she would like to send the selected items to a second party based on the second party's e-mail address. If the answer to the query is "no", process 100 proceeds to 110 where the first party enters a desired shipping address in a conventional manner, such as by filling out an on-line shipping form. At 112, the shipping information provided by the first party at 110 is verified and an output is provided by retail computer 20 that causes the selected item(s) to be delivered to the desired shipping address entered at 110. The first party is then queried at 114 as to whether he/she would like to continue shopping. If the answer is "yes", process 100 returns to the on-line catalog at 104. If the answer is "no", the first party proceeds to exit the website at 116.

If the answer to the query at 108 is "yes", the first party proceeds to 118, such as by clicking on a "gift by e-mail" icon, or other such icon, for example. At 118, a description of the "gift by e-mail" process is provided. In one embodiment, the description may include an explanation of a return policy employed as part of the gift by e-mail process. For example, in one embodiment, since the second party's street address is not revealed to the first party, any items that are not able to be delivered to the second party for any reason, including the selected street address being incorrect and the second party refusing the gift, will be returned directly to the retailer. In one embodiment, the first party is instructed that any such return of merchandise will result in a "re-stock" charge to the first party.

At 120, a process for determining and selecting a shipping address associated with the second party's e-mail address, such as that described above with regard to FIG. 2, is performed. Such process involves the first party entering the second party's e-mail address and the first party potentially selecting one of up to several street/shipping addresses associated with the e-mail address. One illustrative embodiment of a process for determining and selecting a shipping address based on the second party's e-mail address is described in greater detail below with reference to FIG. 3. If the first party is able to select an address associated with the second party's e-mail address, retail computer 20 causes the selected item(s) to be delivered to the selected shipping address without revealing the selected address to the first party. Upon completing the process at 120, regardless of whether the first party is able to select a shipping address for the second party and deliver the gift, process 100 proceeds to 114 where the first party either returns to shopping at 104 or exits the website at 116.

Figure 3:
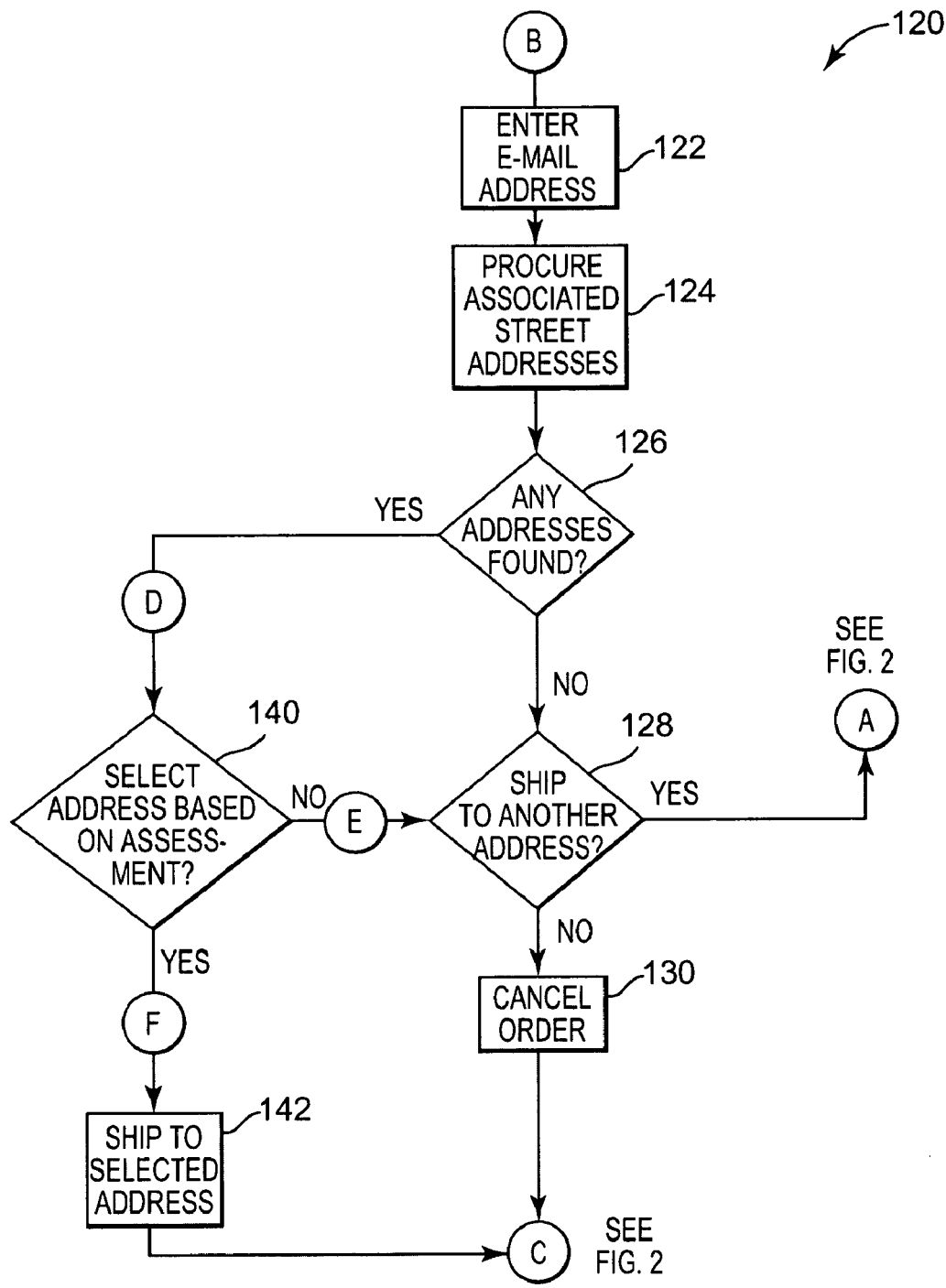
FIG. 3 is a flow diagram illustrating generally one embodiment of a process for selecting a street address in accordance with the present invention.

FIG. 3 is a flow diagram illustrating one embodiment of process 120, illustrated generally by FIG. 2, for determining and selecting a street/shipping address based on the second party's e-mail. Process 120 begins at 122 where the first party is prompted to enter the e-mail address of the second party. At 124, with reference to FIG. 1, delivery module 24 searches internal database 26 and/or databases 52 of third party computers 50 which are part of retail system 10. Upon completing the search at 126, the number of street/shipping addresses found to be associated with the second party's e-mail address is determined.

If no street/shipping addresses are found that are associated with the second party's e-mail address, process 120 proceeds to 128 where the first party is queried as to whether he/she would like to ship the items to another address. If the answer to the query is "no", the order is cancelled and process 120 proceeds to 114 (see FIG. 2) where the first party either returns to shopping or exits the website.

If one or more street/shipping addresses are found that are associated with the second party's e-mail address, process 120 proceeds to 140. At 140, the first party is able to select one, or to not select any, of the addresses by assessing the likelihood that one of the street/shipping addresses procured at 124 is the actual address of the second party based on the querying process with respect to address components as described above FIG. 1. One illustrative embodiment of a process for assessing and selecting an address from those procured at 124 is described in greater detail by FIG. 4 below. If the first party is unable to select one of the procured addresses, process 120 proceeds to 128. If the user is able to select one of the procured addresses, process 120 proceeds to 142 where retail computer 20 provides an output that causes the selected item(s) to be delivered to the shipping address selected at 140 without revealing the selected address to the first party.

Figure 4:
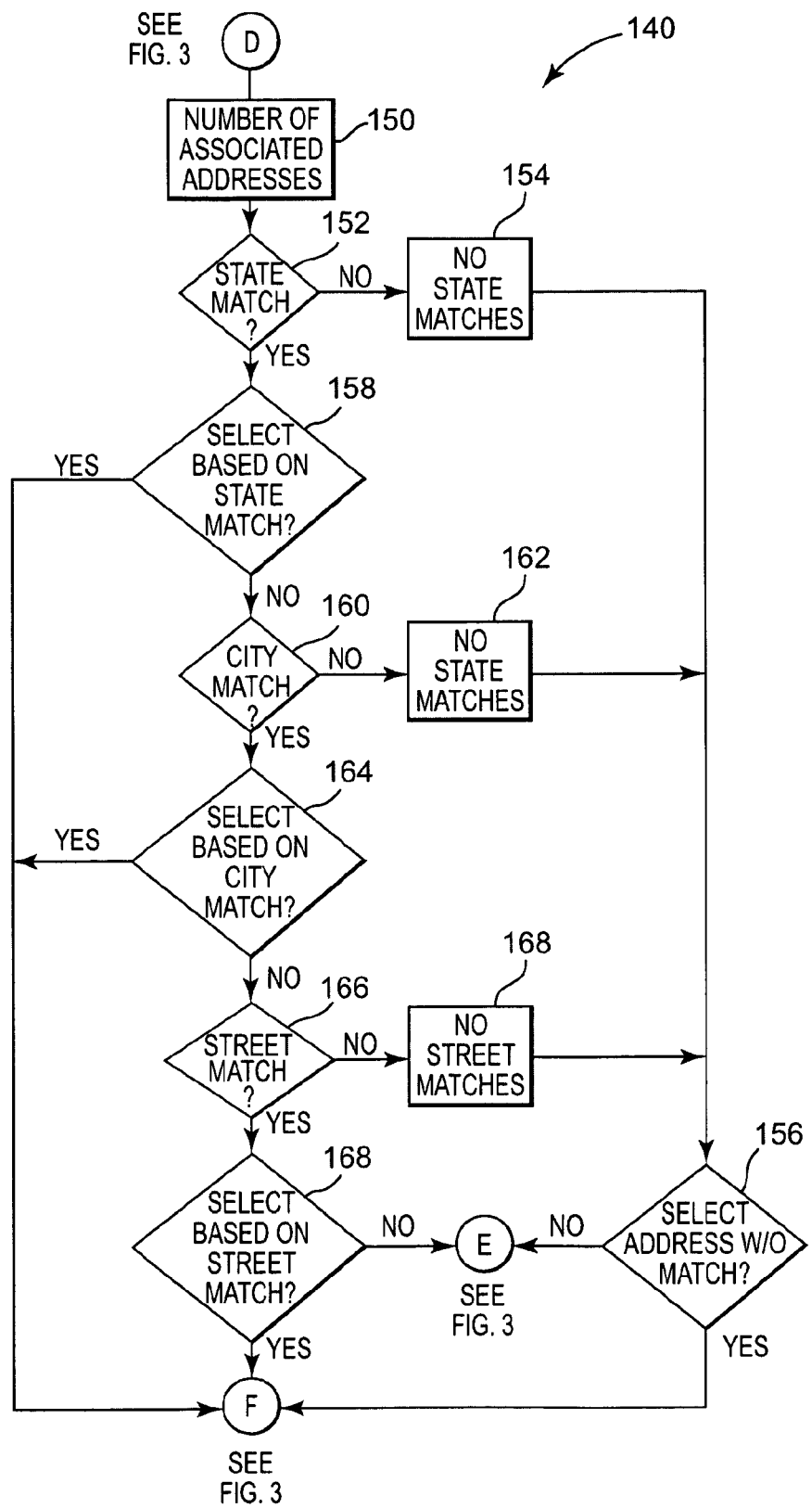
FIG. 4 is a flow diagram illustrating one embodiment of a process for assessing street addresses in accordance with the present invention.

FIG. 4 is a flow diagram illustrating one embodiment of process 140, illustrated generally by FIG. 3, for assessing and selecting a street/shipping address from one or more street/shipping addresses associated with an e-mail address. Process 140 begins at 150, where the first party is informed of how many street/shipping addresses were found that are associated with the e-mail address of the second party, while maintaining the anonymity of the street/shipping addresses to the first party. To begin assessing the procured street/shipping addresses, the first party is queried as to whether he/she knows the state in which the second party resides.

If the state entered by the first party in response to the query fails to match the state component of any of the anonymous street/shipping addresses, process 140 proceeds to 154 where the first party is informed that none of the anonymous street/shipping addresses correspond to the entered state. Process 140 then proceeds to 156, where the first party is queried as to whether he/she would like to select one of the anonymous addresses in spite of there being no match. For instance, there may have only been one anonymous address from which to select, and even though the entered state did not match, the first party may feel confident that the anonymous street/shipping address is the correct shipping address. If the answer to the query is "no", process 140 proceeds to 128 (see FIG. 3) where the first party has the option to ship the gift to another address. If the answer to the query is "yes", process 140 proceeds to 142 (see FIG. 3) where retail computer 20 (see FIG. 1) provides an output that causes the selected item(s) to be delivered to the shipping address selected at 140 without revealing the selected address to the first party.

If the state entered by the first party in response to the query at 150 matches at least one of the state components of the anonymous street/shipping addresses, process 150 proceeds to 158. At 158, the first party is informed as to which of the anonymous street/shipping addresses have the matching state components and is queried as to whether he/she would like to one of the anonymous addresses that have the matching state component. For example, only one of the anonymous street/shipping addresses may have a matching state component and the first party may be confident that it is the correct shipping address. If the first party selects one of the anonymous street/shipping addresses that has a matching state component, process 140 proceeds to 142 (see FIG. 3) where retail computer 20 (see FIG. 1) provides an output that causes the selected item(s) to be delivered to the shipping address selected at 140 without revealing the selected address to the first party.

If the first party does not select one of the anonymous street/shipping addresses, process 140 proceeds to 160 where the first party is queried as whether he/she knows the city in which the second party resides. If the city entered by the first party in response to the query fails to match the city component of any of the anonymous street/shipping addresses whose state components match the state previously entered by the first party, process 140 proceeds to 162 where the first party is informed that none of the anonymous street/shipping addresses correspond to the entered city and then to 156.

If the city entered by the first party in response to the query matches the city component of any of the anonymous street/shipping addresses whose state components match the state previously entered by the first party, process 140 proceeds to 164. At 164, the first user is informed which anonymous street/shipping addresses have both a state component and city component corresponding to the first party's entries and is queried as to whether he/she would like to select one as the street/shipping address to which the gift should be delivered. If the first party selects one of the anonymous street/shipping addresses that has matching state and city components, process 140 proceeds to 142 (see FIG. 3) where retail computer 20 (see FIG. 1) provides an output that causes the selected item(s) to be delivered to the shipping address selected at 140 without revealing the selected address to the first party.

If the first party does not select one of the anonymous street/shipping addresses, process 140 proceeds to 166 where the first party is queried as to whether he/she knows the street on which the second party resides. If the street entered by the first party in response to the query fails to match the street component of any of the anonymous street/shipping addresses whose state and city components match the state and city previously entered by the first party, process 140 proceeds to 168, where the first party is informed that none of the anonymous street/shipping addresses correspond to the entered street, and then to 156.

If the street entered by the first party is response to the query matches the street component of any of the anonymous street/shipping addresses whose state and city components match the state and city previously entered by the first party, process 140 proceeds to 168. At 168, the first party is informed which anonymous street/shipping addresses have state, city, and street components corresponding to the first party's entries and is queried as to whether he/she would like to select one as the street/shipping address to which the gift should be delivered. If the first party selects one of the anonymous street/shipping addresses that has matching state, city, and street components, process 140 proceeds to 142 (see FIG. 3) where retail computer 20 (see FIG. 1) provides an output that causes the selected item(s) to be delivered to the shipping address selected at 140 without revealing the selected address to the first party.

If the first party does not select one of the anonymous street/shipping addresses, even though at least one of the anonymous street/shipping addresses has state, city, and street components matching those entered by the first party, process 140 proceeds to 128 (see FIG. 1) where the first party has the option of delivering the gift to another address. A situation corresponding to the above scenario could arise where the first party is aware that the second party has recently moved from one location to another location on the same street and is not able to select between two anonymous addresses having state, city, and street components matching the first user's entries.

Although FIG. 4 illustrates the queries to the first party as comprising questions related to the state, city, and street components of the shipping addresses, queries may be directed to other components of the procured street/shipping addresses as well. For example, queries may be directed to the first and last name of the second party, wherein similar to that described above, delivery module 24 informs the first party which, if any, of the procured shipping addresses include the first and/or last name provided by the first party. The queries may also be directed to house number, apartment numbers, and zip codes, for example.

In one embodiment of the present invention, in lieu of searching internal and external databases 26 and 52 and querying the first party to determine a shipping address as described above with respect to FIGS. 1 through 4, delivery module 24 generates and delivers an e-mail request to the e-mail address of the second party, as provided by the first party, directly requesting a shipping address from the second party. In one embodiment, the e-mail request indicates that the first party wishes to deliver a gift to the second party and includes a description of the gift delivery system explaining that the second party's identity and shipping address, if so provided by the second party, will not be divulged to the first party. In one embodiment, the e-mail request includes a description of the gift to be delivered (e.g. a link to a product description in the retailer's on-line catalog). In one embodiment, delivery module 24 enables the first party to include a message to the second party as part of the e-mail request.

In one embodiment, the second party provides permission to retail module 24 to deliver the gift by replying to the e-mail request and providing a shipping address. Similarly, the second party can deny permission to deliver the gift through a response to the e-mail request and by failing to respond to the e-mail request within a predetermined time period (such as within ten days, for example).

An example of where such an embodiment may be employed is when a corporation (or other entity or person) wishes to purchase and deliver a gift to its employees, but for legal or other reasons is unable to utilize residence information that may already be in the corporation's possession (e.g. accounting records) for purposes of delivering such a gift. In such an instance, the corporation may request permission to deliver a gift, direct that such a gift be shipped, and/or take other appropriate action as described herein, via merchandise and delivery modules 22 and 24 of retailer computer 20, merely by providing the employees' corporate e-mail addresses.

In summary, a retail system according to embodiments of the present invention, such as retail system 10 employing processes 100, 120, and 140 described above, enables a user to select, purchase, and deliver a gift to a recipient based on the recipient's e-mail address without revealing the street/shipping address of the recipient address to the user. By not disclosing the street/shipping address of the recipient to the user, retail system 10 enables a user to send a gift to the recipient while maintaining the recipient's privacy.

Although described generally above in terms of one party delivering a gift to a second party based on an e-mail address, wherein the e-mail address of the second party which is known to the first party, people often communicate anonymously with others via the Internet using aliases or pseudonyms. For example, on-line dating services typically enable members to send messages or chat with one another using only a pseudonym, thereby remaining anonymous to one another if so desired. Despite this anonymity, however, one member way wish to purchase and deliver a gift to a second member with whom he/she has established an on-line relationship but knows only by a pseudonym and who wishes to remain anonymous to the first member.

Figure 5:
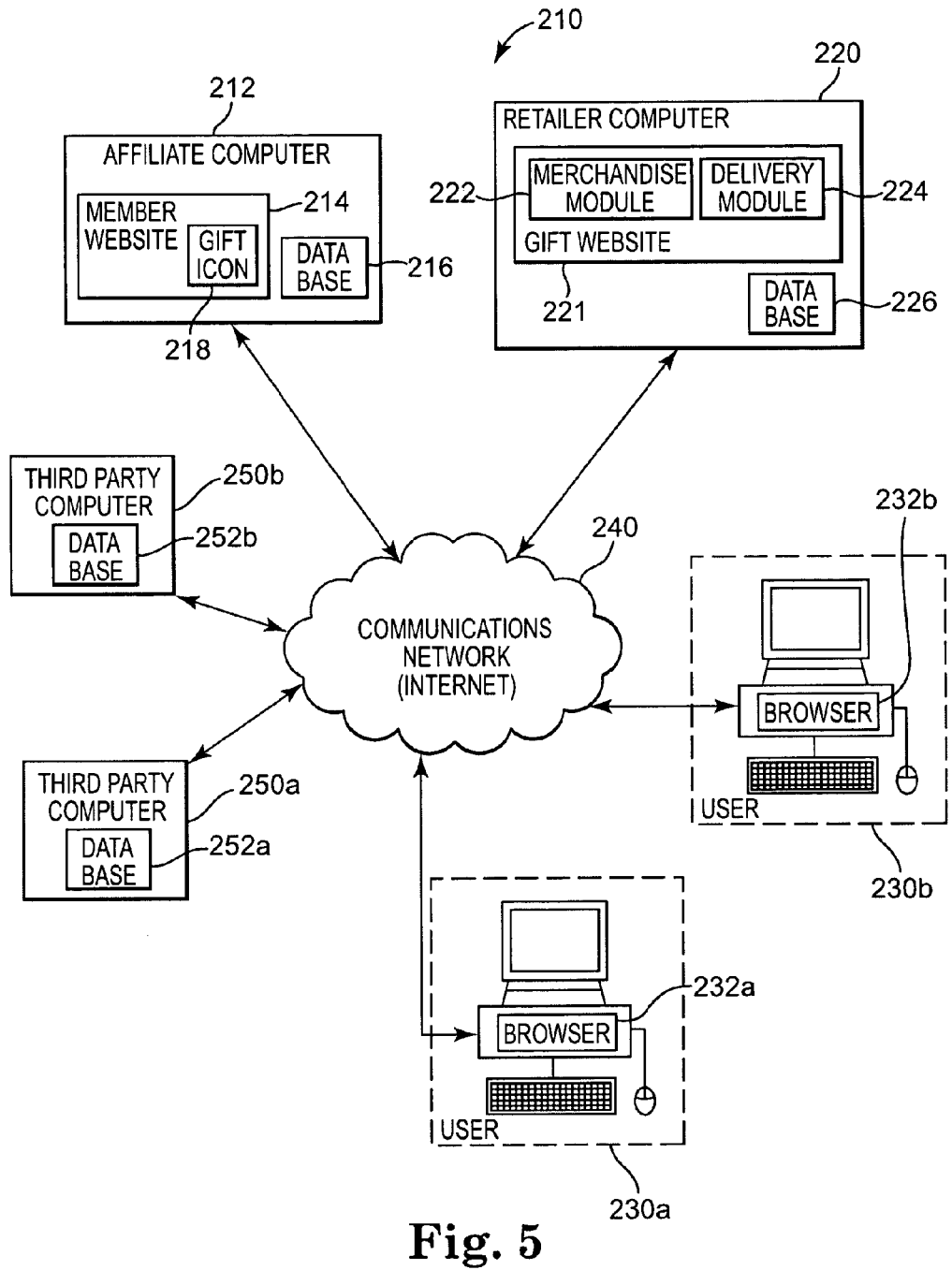
FIG. 5 is a block diagram illustrating one embodiment of a retail system according to the present invention.

FIG. 5 is a block diagram illustrating generally one embodiment of a retail system 210 according to the present invention which enables members of a members-only website to purchase and deliver gifts to one another while maintaining the anonymity and privacy of the members. Retail system 210 includes an affiliate computer 212 and a retailer computer 220. Affiliate computer 212 is programmed to provide a members-only website 214 accessible via a communications network 240 by members employing user devices, such as user devices 230*a* and 230*b*, having World Wide Web browsers, such as browsers 232*a* and 232*b*.

Members-only website 214 is programmed to enable registered members to communicate anonymously with one another, such as via on-line chat rooms, instant messaging, and electronic mailboxes, using member-chosen pseudonyms. In one embodiment, members-only website 214 comprises on-line dating website 214, although website 214 may also comprise other types of services, businesses, groups or other websites. In one embodiment, as part of a member registration process, members provide an e-mail address to the administrators of on-line dating website 214 so that password and other website-related information can be communicated to the members. As part of the registration process, members also provide a pseudonym which will be used for anonymous communications with other members. In one embodiment, affiliate computer 212 maintains a confidential register or database 216 including a pseudonym and a corresponding e-mail address for each registered member. Register or database 216 is not accessible by members. It is noted that although described as a members-only website, depending on the requirements of the website, members may or may not be charged a membership fee as part of the registration process.

Retailer computer 220 includes a gift website 221 having a merchandise module 222 and a delivery module 224. Gift website 221 is linked with on-line dating website 214, with merchandise module 222 configured to provide an on-line catalog that enables members to peruse, select, and purchase merchandise offered for sale by the retailer. In one embodiment, merchandise module 222 is accessible only by members of on-line dating website 214.

In one embodiment, when a first member of on-line dating website 214 wishes to purchase and deliver a gift to a second member, the first member initially accesses on-line dating website 214 on affiliate computer 212 via a user device, such as user device 230a, and selects or clicks on a gift link or gift icon 218 that transfers the first member to merchandise module 222 on retailer computer 220. At merchandise module 222, the first member peruses and selects one or more gifts for purchase from the on-line catalog. In one embodiment, the on-line catalog comprises a list of recommended and/or appropriate gift items which are selected and maintained by retailer staff. In one embodiment, merchandise module 222 is configured to generate an on-line catalog comprising a list of recommended gift items based on attributes of the second member (e.g. gender, age, interests, etc.) entered by the first member. In one embodiment, the on-line catalog comprises a complete list of merchandise available for sale by the retailer.

Upon selecting one or more items for purchase, merchandise module 222 transfers the first member to delivery module 224 where payment and billing information is collected from the first member. Delivery module 224 prompts the first member for the pseudonym of the second member to whom the selected gift is to be delivered. Delivery module 224 subsequently accesses database 216 of affiliate computer 212 via communications network 240 and retrieves the e-mail address corresponding to the pseudonym for the second member provided by the first member.

In a fashion similar to that described above with respect to delivery module 24 of FIG. 1, delivery module 224 procures up to several street addresses associated with the second member pseudonym. In one embodiment, delivery module 224 procures the street addresses by searching an internal e-mail/street address database 226 maintained by retail computer 220 which includes information such as names, street addresses, and e-mail addresses provided by present and previous customers of the retailer. In one embodiment, delivery module 224 procures the street addresses from one or more third party computers maintaining similar databases, such as third parties 250a, 250b and associated databases 252a, 252b. Third party computers 250 may be associated with Internet service providers, on-line retailers, or any other entity (such as financial institutions) maintaining such databases with whom the retailer has contracted with for access.

After searching internal and external databases 226 and 252, delivery module 224 informs the first member of the number of street addresses, if any, which were found to be associated with the confidential e-mail address corresponding to the second member's pseudonym. If no street addresses were found, delivery module 224 directs the first member back to on-line dating website 214. If one or more street/delivery addresses were procured, delivery module 224 queries the first member about selected components of the procured addresses (e.g. party's name, state, city, street name, etc.) in a fashion similar to that described above with respect to delivery module 24 of FIG. 1 and described by FIGS. 2 through 4 to enable the first member to select one of the procured addresses for shipping without revealing the selected address to the first member.

Figure 6:
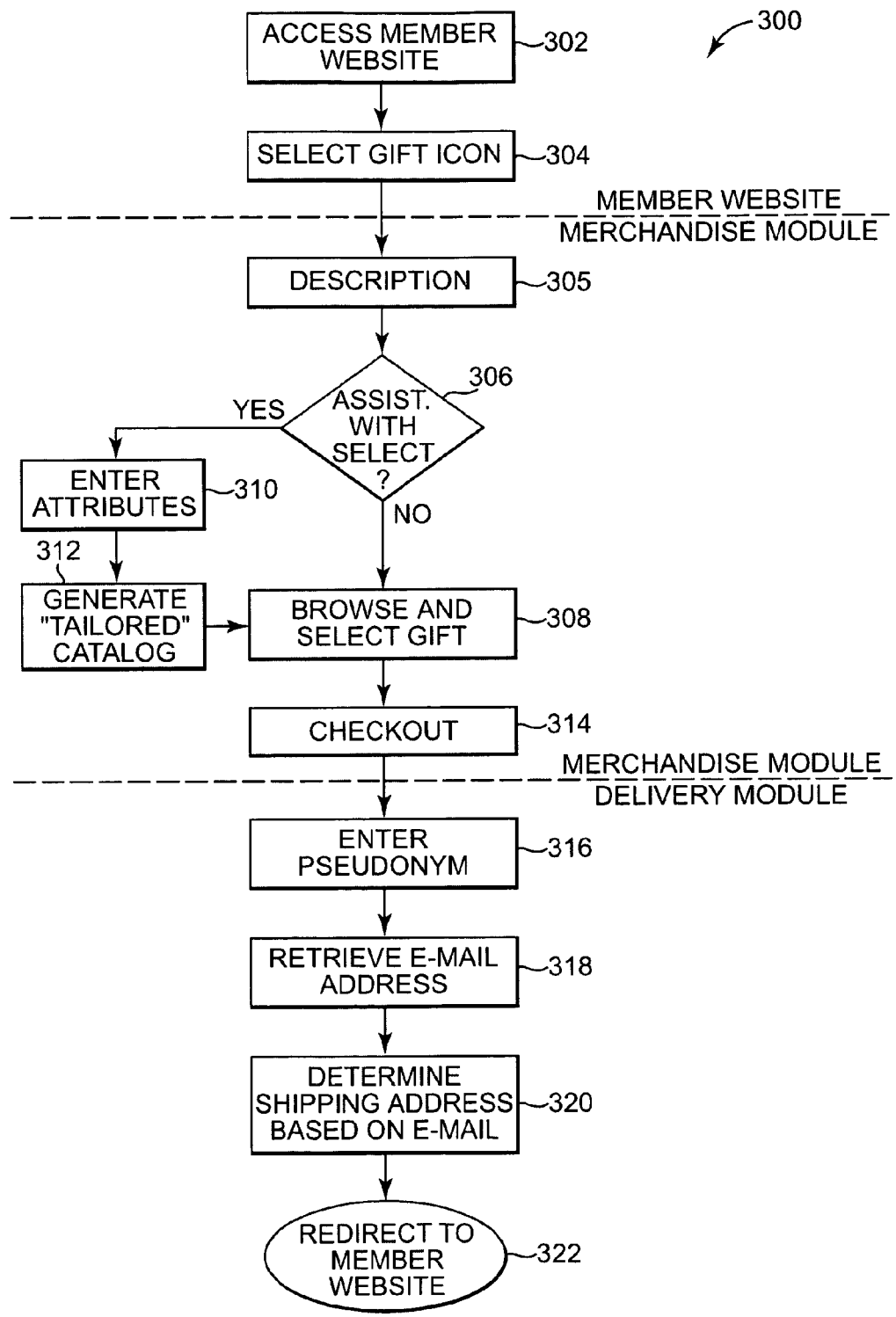
FIG. 6 is a flow diagram illustrating one embodiment of a process describing the operation of the retail system of FIG. 5.

FIG. 6 is a flow diagram illustrating generally one embodiment of a process 300 describing the operation of retail system 210 of FIG. 5. Process 300 begins at 302 where a first member of on-line dating website 214 logs into member website 214 on affiliate computer 212 via a user device such as user device 230a. At 304, the first member clicks on or selects gift icon 218 which transfers the first member to merchandise module 222 of retailer computer 220. In one embodiment, gift icon 218 provides an indication to members of on-line dating website 214 that they can receive discounts on gifts purchased for other members via retail computer 220. In one embodiment, gift icon 218 provides an indication to members of on-line dating website 214 that they can receive discounts not only on gifts purchased for other members, but discounts on items in general if they register as users with the retailer operating retail computer 220.

At 305, a description of the pseudonym-based gift delivery process is provided to the first member. In one embodiment, the description may include an explanation of a return policy. For example, in one embodiment, since the second member's real name and address are not revealed to the first member, a gift not able to be delivered to the second party will be returned directly to the retailer to maintain the anonymity of the second member. In one embodiment, the first member is instructed that any such return of merchandise will result in a "re-stock" charge to the first member.

At 306, merchandise module 222 queries the first member as to whether he/she would like assistance in selecting a gift or gifts for the second member. If the answer to the query is "no", process 300 proceeds to 308 where the first member is able to browse the on-line catalog and select one or more gifts. In one embodiment, the on-line catalog comprises a complete list of merchandise available for sale by the retailer.

If the answer to the query is "yes", process 300 proceeds to 310 where the first member is prompted to enter any known attributes of the second member for whom the gift(s) is being selected. Such attributes include things such as the second member's gender, age, and interests, for example. At 312, merchandise module 222 generates an on-line catalog comprising a "tailored" list of recommended gift items based on attributes entered by the first member. Process 300 then proceeds to 308 where the first member peruses and selects a gift(s) from the tailored on-line catalog.

After selecting a gift(s), the first member proceeds to checkout at 314, at which time payment and other information may be collected. At 316, the first member is prompted to enter the pseudonym of the second member for whom the gift is being purchased. At 318, delivery module 224 accesses database 216 of affiliate computer 212 via communications network 240 and retrieves the e-mail address corresponding to the pseudonym for the second member entered by the first member.

At 320, delivery module 224 procures up to several shipping/street addresses based on the e-mail address corresponding to the second member's pseudonym using a querying process with the first member as described above with respect to FIG. 5 and similar to the process described by FIGS. 1-4 with respect to deliver module 24. If the first member is able to select a shipping address for second member, delivery module 224 causes the selected gift(s) to be delivered to the selected shipping address without revealing the selected shipping address to the first member. Upon either successfully selecting a shipping address and shipping a gift to the second member or if no address is able to be selected by the first member, process 300 proceeds to 322 where the first member is directed back to on-line dating website 214.

In one embodiment, delivery module 224 provides and delivers a notice along with the gift explaining the gift delivery process and ensuring the second member that his/her identity and address remain unknown to the first member. In one embodiment, delivery module 224 enables the first member to compose a message which is included with delivery of the gift(s) to the second member.

By procuring street addresses based on e-mail addresses corresponding to pseudonyms employed by members of a members-only website to carry on anonymous communications with one another, retail system 210 enables a first member to purchase and deliver a gift to a second member without disclosing either the e-mail address or the street/shipping address to the first member. As such, members are able to purchase and delivery gifts to one another while maintaining their anonymity.

Retail system 210 benefits both an affiliate entity operating the members-only website, such as on-line dating website 214, and a retailer operating and maintaining gift website 221 on retailer computer 220. Because gift website 221 is maintained by the retailer operating retailer computer 220, the affiliate entity operating on-line dating website 214 benefits from retail system 210 by being able to offer a gift-giving feature to its members without bearing the cost of maintaining and operating such a feature. Such a gift-giving feature may enable on-line dating website 214 to attract new members. The retailer operating and maintaining gift website 221 on retailer computer 220 benefits from retail system 210 by being able to attract and maintain customers from on-line dating website 214. To attract such new customers, members of on-line dating website 214 may be offered incentives from the retailer in the form of product discounts or other promotional offers.

Components of the present invention can be implemented in hardware via a microprocessor, programmable logic, or state machine, in firmware, or in software with a given device. In one aspect, at least a portion of the software programming is web-based and written in HTML and JAVA programming languages, including links to user interfaces, such as a Windows based operating system, and each of the main components may communicate via a network using a communication protocol. For example, the present invention may or may not use a TCP/IP protocol for data transport. Other programming languages and communication protocols suitable for use with the present invention will become apparent to those skilled in the art after reading the present application. Components of the present invention may also reside in software on one or more computer-readable mediums, which is defined herein to include any kind of memory, volatile or non-volatile, such as floppy disks, hard drives, read-only memory (ROM), CD-ROMs, flash memory, and random access memory (RAM).

Although the invention has been described with respect to particular embodiments, such embodiments are for illustrative purposes only and should not be considered to limit the invention. Various alternatives and changes will be apparent to those of ordinary skill in the art.

What is claimed is:

1. A retail system enabling a first party to purchase a gift and to deliver the gift to a second party, the system comprising:
an affiliate computer programmed to maintain a confidential register of pseudonyms and corresponding e-mail addresses for each of the pseudonyms;
a retailer computer programmed to provide a gift website accessible by the first party via a user device and including:
a merchandise module which enables the first party to select and purchase a gift, and
a delivery module adapted to receive pseudonym of the second party from the first party, the delivery module being configured to use the pseudonym of the second party to obtain an e-mail address corresponding to the pseudonym of the second party received from the first party based on the confidential register, then procure up to several shipping addresses associated with the e-mail address with each shipping address comprising a plurality of address components, to query the first party regarding one or more of the plurality of address components of the up to several shipping addresses, to enable the first party to select one of the up to several shipping addresses based on the queries, and to cause the gift to be shipped to the selected shipping address without revealing all of the plurality of address components of the selected shipping address to the first party; and
a communication network enabling the user device and the affiliate computer to communicate with the retailer computer.

2. The retail system of claim 1, wherein the delivery module is configured to enable the first party to ship the gift to a desired shipping address entered by the first party if the first party is unable to select one of the up to several shipping addresses based on the queries.

3. The retail system of claim 1, wherein the gift is returned to the retailer if the gift is unable to be delivered to the selected address, further wherein the first party is optionally charged a fee if the gift is unable to be delivered to the selected address.

4. The retail system of claim 1, wherein:
the affiliate computer is programmed to provide a member website configured to enable members to communicate with one another anonymously using corresponding pseudonyms;
wherein the first party is a first member of the member website and the second party is a second member of the member website.

5. The system of claim 4, wherein the member website comprises an on-line dating service.

6. The system of claim 4, wherein the gift website is accessible via only the member website by members.

7. The system of claim 4, wherein the merchandise module is configured to provide and maintain a selection of gifts based on a type of service provided by the member website.

8. The system of claim 4, wherein the merchandise module is configured to provide a menu of recommended gift selections based on various attributes of the second member provided by the first member.

9. The system of claim 1, wherein the plurality of address components of each of the up to several shipping addresses includes a street level component, and the delivery module is configured to query the first party regarding one or more address components and to enable the first party to select one of the up to several shipping addresses without revealing the street level component of any of the up to several shipping addresses to the first party.

10. The system of claim 1, wherein the delivery module is configured to remotely communicate with one or more databases and to procure the up to several shipping addresses from the one or more databases based on the e-mail address or pseudonym of the second party.

11. The system of claim 10, wherein the one or more databases includes one or more databases provided by a third party that differs from the retail system.

12. The system of claim 1, further comprising an internal database in communication with the delivery module, wherein the delivery module is configured to procure the up to several shipping addresses from the internal database based on the e-mail address or pseudonym of the second party, and the internal database is compiled based on data provided by previous parties that have utilized the delivery module via the communication network.

13. A method enabling a first party to purchase and have a gift delivered to a second party, wherein each of the first party and the second party are members of a member website at which members can communicate anonymously with one another using pseudonyms, the method comprising:
- maintaining a retail computer configured to remotely access a database populated with a pseudonym and a corresponding e-mail address for each member of the member website;
- providing an on-line product catalog at a retailer website that enables the first party to peruse and select a gift for the second party, wherein the retail computer is programmed to provide the retailer website;
- receiving via the retailer website a pseudonym of the second party from the first party;
- retrieving the corresponding e-mail address for the second party from the database based on the pseudonym of the second party;
- procuring a shipping address associated with the retrieved corresponding e-mail address; and
- shipping the selected gift to the shipping address;
- wherein the method is completed in a manner maintaining a street level component of the shipping address in secret without disclosing the street level component of the shipping address to the first party.

14. The method of claim 13, wherein the member website comprises an on-line dating website.

15. The method of claim 13, wherein providing the on-line product catalog includes providing the on-line product catalog comprising a plurality of products recommended by the retailer website.

16. The method of claim 13, wherein providing the on-line product catalog includes generating an on-line product catalog of recommended gift items based on attributes of the second party.

17. The method of claim 13, wherein shipping the selected gift includes delivering a notice along with the selected gift explaining a process used to deliver the selected gift and ensuring the second party that his/her identity and address remain unknown to the first member.

18. The method of claim 17, wherein shipping the selected gift includes delivering a message from the first party to the second party along with the gift.

19. The method of claim 13, wherein maintaining the retail computer includes programming the retail computer to provide the retailer website including:
- a merchandise module which enables the first party to select and purchase a gift and provides the on-line product catalog, and
- a delivery module adapted to receive the pseudonym of the second party from the first party, to procure up to several shipping addresses associated with the corresponding e-mail address with each of the up to several shipping addresses comprising a plurality of address components, to query the first party regarding one or more of the plurality of address components of the up to several shipping addresses, to enable the first party to select one of the up to several shipping addresses based on the queries, and to cause the gift to be shipped to the selected shipping address without revealing all of the plurality of address components of the selected shipping address to the first party,
- wherein the merchandise module and the delivery module are each accessible by the first party and the second party via a communication network enabling user devices each associated with at least one of the first party and the second party to communicate with the retail computer.

20. The method of claim 13, further comprising creating the database based on membership registrations where each of the members of the member website provides the corresponding email address to the pseudonym respectively associated with each of the members.

* * * * *